United States Patent
König et al.

(10) Patent No.: US 8,497,345 B2
(45) Date of Patent: *Jul. 30, 2013

(54) DEVICE AND METHOD FOR DEGASSING SOLVENT-CONTAINING POLYCARBONATE SOLUTIONS

(75) Inventors: Thomas König, Leverkusen (DE); Klemens Kohlgrüber, Kürten (DE); Johan Vanden Eynde, Zwijnaarde (BE); Ing Johan Vaes, Kalmthout (BE); Stefaan De Vos, Rayong (TH)

(73) Assignee: Bayer Intellectual Property GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/322,731

(22) PCT Filed: Mar. 26, 2010

(86) PCT No.: PCT/EP2010/003206
§ 371 (c)(1),
(2), (4) Date: Jan. 27, 2012

(87) PCT Pub. No.: WO2010/139413
PCT Pub. Date: Dec. 9, 2010

(65) Prior Publication Data
US 2012/0123084 A1    May 17, 2012

(30) Foreign Application Priority Data
May 30, 2009   (EP) .................................... 09007269

(51) Int. Cl.
*C08G 64/00* (2006.01)
*C08G 63/02* (2006.01)

(52) U.S. Cl.
USPC ........................................................ 528/501

(58) Field of Classification Search
USPC ..................... 159/2.2, 2.3; 264/219; 528/196, 528/198
See application file for complete search history.

(56) References Cited

U.S. PATENT DOCUMENTS

| | | |
|---|---|---|
| 2,964,513 A | 12/1960 | Dale |
| 3,450,183 A | 6/1969 | Hinton |
| 3,458,494 A | 7/1969 | Scoggin |
| 3,741,272 A | 6/1973 | Ullrich et al. |
| 4,312,642 A | 1/1982 | Lehr et al. |
| 4,906,329 A | 3/1990 | Tominari et al. |
| 5,283,021 A | 2/1994 | Shih |
| 5,708,133 A | 1/1998 | Higuchi et al. |
| 6,353,088 B1 | 3/2002 | Fujitaka et al. |
| 6,534,619 B1 | 3/2003 | Elsner et al. |
| 6,620,906 B1 | 9/2003 | Elsner et al. |
| 6,811,294 B1 | 11/2004 | Elsner et al. |
| 6,949,622 B2 * | 9/2005 | Silvi et al. ...................... 528/481 |
| 2001/0056176 A1 | 12/2001 | Takami et al. |
| 2003/0176636 A1 | 9/2003 | Liesenfelder et al. |
| 2005/0092444 A1 | 5/2005 | Kohlgruber |
| 2005/0234219 A1 | 10/2005 | Silvi et al. |
| 2011/0141843 A1 | 6/2011 | Bierdel et al. |
| 2011/0160381 A1 | 6/2011 | Konig et al. |
| 2012/0108782 A1 * | 5/2012 | Konig et al. .................. 528/196 |

FOREIGN PATENT DOCUMENTS

| | | |
|---|---|---|
| DE | 29 08 352 A1 | 9/1980 |
| DE | 100 16 894 A1 | 10/2001 |
| DE | 103 33 577 A1 | 2/2005 |
| DE | 10 2008 029 305 | 12/2009 |
| DE | 10 2008 029306.7 | 12/2009 |
| EP | 027 700 A2 | 4/1981 |
| EP | 0 257 520 A2 | 3/1988 |
| EP | 0359432 A2 | 3/1990 |
| EP | 1113 848 A1 | 7/2001 |
| EP | 1 165 302 A1 | 1/2002 |
| EP | 1 265 944 A1 | 12/2002 |
| EP | 1 510 530 A1 | 3/2005 |
| GB | 1330890 A | 9/1973 |
| JP | 05017516 A | 1/1993 |

OTHER PUBLICATIONS

"Der gleichläufige Doppelschneckenextruder" [The Corotatory Twin-Screw Extruder], Klemens Kohlgrüber, Carl Hanser Verlag, ISBN 978-3-446-41252-1, on pp. 193-195.
Schnell, "Chemistry and Physics of Polycarbonates", Polymer Reviews, vol. 9, Interscience Publishers, New York, London, Sydney 1964, pp. 33-70.
Bierdel et al., "Co-Rotating Twin-Screw Extruders—Fundamentals, Technology and Applications", pp. 183-184 Carl Hanser Publishers, Munich (2008).
Young et al., "Taste and Odour Threshold Concentrations of Potential Potable Water Contaminants", Wat. Res. vol. 30, No. 2, pp. 331-340 (1996).
H. Burttschel et al., J. Am. Water Works Assoc., 51:205(1959) "Chlorine derivative of phenol causing taste and odor" and C. Joll et al., Curtin University of Technology, Centre for Applied organic Geochemistry, "The Chemistry of Halophenol Tastes in Perth Drinking Water".

* cited by examiner

*Primary Examiner* — Terressa Boykin
(74) *Attorney, Agent, or Firm* — Novak Druce Connolly Bove + Quigg LLP

(57) ABSTRACT

The invention relates to an apparatus and a process for devolatilizing solvent-containing polycarbonate solutions. By employing the inventive apparatus, polycarbonates with low residual values of volatile constituents are produced from solvent-containing polymer melts, which improved optical properties, especially yellowness index, with the aid of an apparatus combination of a flash devolatilizer and a vented extruder.

14 Claims, 2 Drawing Sheets

DEVICE AND METHOD FOR DEGASSING SOLVENT-CONTAINING POLYCARBONATE SOLUTIONS

PRIORITY

Priority is claimed as a national stage application, under 35 U.S.C. §371, to PCT/EP2010/003206, filed May 26, 2010, which claims priority to European Application No. 09007269.5, filed May 30, 2009. The disclosures of the aforementioned priority applications are incorporated herein by reference in their entirety.

The invention relates to an apparatus and a process for devolatilizing solvent-containing polycarbonate solutions. By employing the inventive apparatus, polycarbonates with low residual values of volatile constituents are produced from solvent-containing polymer melts, which improved optical properties, especially yellowness index (YI), with the aid of an apparatus combination of a flash devolatilizer and a vented extruder.

In the known interfacial process for preparing polycarbonates, solvents such as aromatic chlorohydrocarbons, especially dichloromethane are used, the residual contents thereof in the end product being unwanted since they are disruptive in the polycarbonate. In order to remove these volatile constituents, the vented extruder has to be operated at relatively high temperatures by the processes known from the prior art, which gives rise to thermal damage, and this has the disadvantage of worsened optical properties.

Efficient concentration of the polycarbonate solution and vaporization of the residual contents of solvents at low temperatures is therefore of utmost importance for obtaining polycarbonates with improved optical properties.

There have been a variety of literature descriptions of the process for polycarbonate synthesis by the interfacial process, for instance in Schnell, "Chemistry and Physics of Polycarbonates", Polymer Reviews, Volume 9, Interscience Publishers, New York, London, Sydney 1964, pages 33-70.

In the interfacial process, a disodium salt of a biphenol (or of a mixture of different biphenols), initially charged in aqueous alkaline solution (or suspension), is phosgenated in the presence of an inert organic solvent or solvent mixture which forms a second phase. The oligocarbonates which form and are present principally in the organic phase are condensed with the aid of suitable catalysts to give high molecular weight polycarbonates dissolved in the organic phase. The organic phase is finally removed and washed in a multistage process in order to remove residues of sodium and catalyst. Typically, the organic phase contains, after the reaction, 10-20% by weight of polycarbonate.

The polycarbonate subsequently has to be isolated from the organic phase. The common processes for concentrating the polycarbonate solution and for isolating the polycarbonate are described in the patent literature and in textbooks, and are familiar to those skilled in the art. The isolation of the polycarbonate from the solution is preferably performed by vaporizing the solvent thermally or by means of vacuum. In order to directly obtain the melt phase after the vaporization of the solvent, this process requires the use of a high-boiling (>100° C.) solvent, for example chlorobenzene. In order to improve the solubility of the polymer in the solvent during the reaction, a mixture of one or more high-boiling solvents and the low-boiling dichloromethane is also used. The weight ratio of dichloromethane to the high-boiling solvent is typically about 1:1.

A further option consists in the injection of a heated gas, in particular steam, to drive out the volatile constituents. This involves spraying the polycarbonate solution with the carrier gas, and obtaining polycarbonate as a solid, especially as a water-moist suspension. Other isolation methods are crystallization and precipitation, and the baking-out of the residues of the solvent in the solid phase. The latter process entails the use of dichloromethane as a solvent, it being possible to achieve residual contents of volatile solvent of about 2 ppm of dichloromethane.

However, residual contents of dichloromethane are particularly disruptive in the polycarbonate since dichloromethane is known to eliminate hydrochloric acid together with residual moisture in the processing operation, and can thus lead to discoloration of the polycarbonate and to corrosion on tools. At elevated temperatures, dichloromethane can also lead to losses of quality such as discoloration and gel formation in the workup operation.

In the known processes for vaporization, or else flash vaporization, polycarbonate solutions are repeatedly heated under slightly elevated pressure to temperatures above the boiling point and these superheated solutions are subsequently decompressed into a vessel, the pressure in the vessel being lower than that corresponding to the vapor pressure in the solution. The repetition of the process is generally favorable since the concentration of polycarbonate in the solution after the reaction is relatively low, and the repetition of the process allows significant overheating to be avoided. Common processes for the evaporation of polycarbonate solutions using apparatus are familiar to those skilled in the art. For example, the superheated solution can be decompressed into a heated helical tube which opens into a separator.

Above a particular concentration of polycarbonate (about 60% by weight), evaporation by flash vaporization becomes more difficult as a result of the high viscosities. Evaporation up to about 60% is referred to hereinafter as preliminary evaporation. It is generally favorable to remove the residual solvent with other processes, apparatuses and machines. These may be, for example, vented extruders or vertical tubular devolatilizers. At the last stage, it is also possible to use strand devolatilizers or foam devolatilizers in order to achieve particularly low residual contents.

In the evaporation of polycarbonate according to the prior art, usually excessively high apparatus temperatures and excessively long residence times of the melt in the apparatus are employed, with which there is sufficient removal of residual volatile constituents in the polycarbonate melt, but damage to the polycarbonate thus prepared occurs. This product damage is usually a direct consequence of excessive thermal stress over the course of excessive residence time of the polymer melt in the devolatilizing apparatus. In the course of this, side reactions occur on the polycarbonate, which cause a deterioration in the optical properties, especially the formation of defective structures, which usually only become visible in UV light in the moldings produced from such polycarbonate. Examples of such defective structures are ultrafine particles and gel bodies. In the processing of polycarbonate to give optical data carriers, for example CDs or DVDs, such defective structures in the end product cause a considerable loss of quality, which is intolerable and has to be avoided.

Concentrations of chlorobenzene-containing polycarbonate solutions are described in EP-A 1 265 944 and EP-A1 113 848, the examples of which describe the preparation of 65% by weight polycarbonate solutions. For removal of residual volatiles in the polycarbonate, in contrast to the subsequent process steps described therein, such polycarbonate solutions can also be evaporated further in vented extruders.

Vented or devolatilizing extruders are known in principle to those skilled in the art and are described, for example, in [1].

Characteristic features of devolatilizing extruders are what are called the devolatilizing domes or devolatilizing orifices. These are housings with orifices through which the vapors which form can escape. It is well known that different devolatilizing domes can be operated at different pressures when the product is backed up between the devolatilizing domes, such that a seal forms between the different pressures.

Such removals of residual volatiles from polycarbonate solutions with the aid of vented extruders are described in DE 29 08 352 and EP 1 165 302. In these two extruder processes, what is called backward devolatilization at the extruder inlet is described. In this case, an optionally preheated polymer solution is introduced into a twin-screw extruder and foams therein. The gases are then removed backward through the flights of the twin-screw extruder to a devolatilizing dome. In general terms, such backward devolatilization is prior art and is described, for example, in the textbook "Der gleichläufige Doppelschneckenextruder" [The Corotatory Twin-Screw Extruder], Klemens Kohlgrüber, Carl Hanser Verlag, ISBN 978-3-446-41252-1, on pages 193-195. One disadvantage of backward devolatilization is a limitation in the amount of solvent evaporated off because the screw channels are relatively narrow and, as a result, high gas velocities are achieved, which can lead to entrainment of product into the backward devolatilizing dome. Thus, a relatively high proportion of residual solvent has to be evaporated out in the further stages of the extruder if 65 to 75% by weight polycarbonate solutions are introduced into these apparatuses and are to be concentrated down to a few ppm, based on the overall polycarbonate material, of residual solvent contents in the polycarbonate. Thermal damage to the polycarbonate may occur, for example yellowing, formation of insoluble constituents, specks, cleavage of the polymer chains, formation of residual monomers and other low molecular weight constituents, etc. It is also disadvantageous when a polycarbonate solution with residual contents of solvent, such as dichloromethane, is fed directly into an extruder, since the overheating of the solution, which is well known to the person skilled in the art, on the flights of the screw in the presence of, for example, dichloromethane can lead to local product damage and hence to discoloration of the overall product.

In addition, EP-A 027 700 discloses the combination of a flash devolatilizer with a vented extruder for concentration of the solutions from olefin polymerization, the flash stage being preceded by injection of stream as an entraining agent into the polymer melt stream. In the case of polycarbonate melts, water at elevated temperature can lead to polymer degradation by hydrolysis. Therefore, such a process is inadvisable for the removal of residual volatiles from polycarbonate melts. It is also stated therein that the product is "collected" in the devolatilizing vessel in the base of the apparatus, and is supplied to the extruder in contact with the base of the devolatilizing vessel, which leads to increased residence times of the polymer and hence to thermal damage.

JP 05017516 describes the use of a tubular vaporizer positioned directly atop the vented extruder for removal of residual volatiles from polymer solutions. The disadvantage of the process regime described here is that the vapors which form in the tubular vaporizer are not removed there, but rather are discharged via the devolatilizing orifices of the vented extruder, including via backward devolatilization. This process thus suffers from the same limitations resulting from high gas velocities in the narrow screw channels as the processes for pure backward devolatilization. The result is elevated shear forces in the extruder, which unavoidably leads to damaging temperature increases.

EP-A 1 510 530 outlines a process in which a polymer solution superheated in a heat exchanger with pressure retention is supplied to a vented extruder. The gases which form are then removed from the extruder by forward and backward devolatilization. This process thus suffers from the same limitations resulting from high gas velocities in the narrow screw channels as the processes for backward devolatilization, and from local superheating at the screw flights in the presence of dichloromethane. As shown by examples 60 to 65 in EP-A 1 510 530 for polycarbonate solutions, the residual solvent contents are sometimes well above 1000 ppm, which is intolerable for most applications.

EP 1 113 848 B1 described, for the last stage of the evaporation, a combination of pipe and strand devolatilizers. This involves first concentrating the polymer solution in a vertical shell-and-tube heat exchanger with downstream separator, proceeding from a solution containing 60% to 75% by weight of polycarbonate, to 98 to 99% by weight, and then concentrating it in a strand devolatilizer to residual contents of 5 to 500 ppm of chlorobenzene. In the case of use of a strand devolatilizer, the polymer melt is shaped to fine strands in a separator under reduced pressure and elevated temperature and thus freed of the solvent. The disadvantage of the strand devolatilizer technique is that effective devolatilization is ensured only by stable strands, meaning that they do not tear in the apparatus. The stability of the strands is influenced by the viscosity of the polymer solution. Too low a viscosity can lead to strand breaks. This leads to a restriction in the operating parameters with regard to temperature and inlet content of residual volatiles. In addition to the adverse influence on the viscosity, an excessive inlet concentration of volatiles directly has adverse effects on the success with which devolatilization can be achieved, since the mass transfer is determined purely by diffusion. The surface area for the mass transfer is, in contrast, fixed by the strand geometry. The requirement for a large area of the melt distributor required to obtain the strands additionally entails expensive, large apparatuses. These large apparatuses in turn inevitably have large areas which, in particular in the discharge, are flowed through by low flow rates. Such low flow rates lead to excessively long residence times of the polycarbonate close to the walls and induce unwanted changes in the polycarbonate there, such as discoloration and formation of gel.

It was therefore an object of the present invention to provide an apparatus and a process for devolatilizing solvent-containing polycarbonate solutions, in which the formation of such unwanted changes in the polycarbonate is avoided. More particularly, it was an object of the invention to improve the existing apparatus for devolatilization and the existing devolatilization process for polycarbonate solutions such that high polycarbonate melt temperatures with prolonged residence times are avoided and low residual solvent contents in the finished polycarbonate are nevertheless achieved.

The object is surprisingly achieved by performing a residual devolatilization with the aid of an apparatus combination of flash devolatilizer and vented extruder. Polycarbonate solutions containing aromatic chlorohydrocarbons, for example chlorobenzene, as a solvent are supplied to this apparatus combination; the polycarbonate solution passes through the flash devolatilizer as the first process stage and the vented extruder as the second, downstream process stage.

The flash devolatilizer used in accordance with the invention is arranged atop a separator and connected directly thereto. The orifice(s) of the flash devolatilizer which is/are charged with polycarbonate solution open in an unrestricted manner into this separator, which is in turn connected in an unrestricted and unblockable manner via the lower cone directly to an extruder housing of the vented extruder, such that the concentrated polycarbonate solution leaving the shell-and-tube heat exchanger can pass directly into the vented extruder.

The invention thus provides an apparatus and a preparation process for removing volatile constituents from solvent-containing polymer melts, especially from polycarbonate solutions comprising aromatic chlorohydrocarbons, with the aid of an apparatus combination of a flash devolatilizer and a vented extruder.

In a particularly preferred embodiment, this apparatus combination is designed with vapor lines such that the solvent-containing vapor formed in the flash devolatilizer is removed directly from the housing of the flash devolatilizer via separators and condensers. Depending on the pressure in the separator, the vapor is removed via a vacuum station.

In a further particularly preferred embodiment of the process according to the invention is injection and mixing of inert components, for example nitrogen, argon, carbon dioxide, water, methane or helium, or a mixture of one or more of these components, preferably nitrogen, as an entraining agent into the polymer melt stream upstream of the flash devolatilizer.

In a further particularly preferred embodiment of the process according to the invention, inert gas is injected as an entraining agent in one or more housings of the vented extruder.

Figure 1:
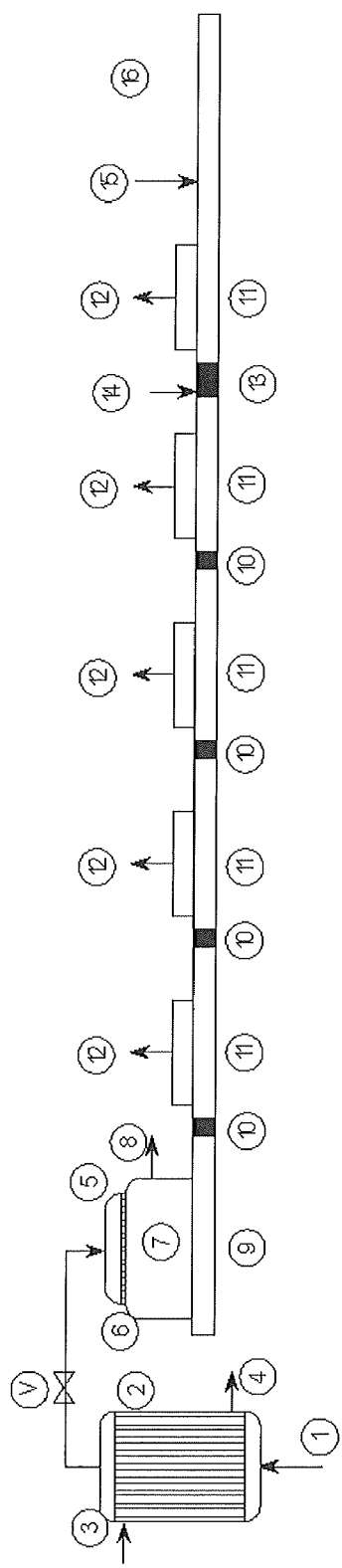
FIG. 1 is the polymer solution is supplied through a feed line to the shell-and-tube heat exchanger.

The evaporation in the flash devolatilizer, said evaporation being upstream of the extruder, allows the speed of the extruder to be lowered and thus the temperature, and hence the product damage, to be reduced.

The flash devolatilizer preferably consists of an inlet element and a separator. The inlet element ensures that the product enters the gas space of the separator, in which the polymer solution separates from the volatile constituents removed, and that the resulting gaseous vapors are removed.

The inlet element can be designed in various ways, for example as a flash valve, as a distributor plate with upstream product distributor, or as one or more essentially horizontal pipes with orifices at the bottom. Preference is given to distributor plates with an upstream product distributor or an essentially horizontal pipe with orifices at the bottom. "Essentially horizontal" means that the pipe relative to the horizontal has an angle of max. 20° C., preferably of max. 10° and more preferably an angle of 0°.

In a preferred embodiment, the inventive device is for devolatilization of polycarbonate solutions, preferably from the interfacial process, comprising at least one organic solvent. In the context of this application, the terms "polycarbonate solutions" and "polycarbonate melts" should be considered to be equivalent.

The 65 to 75% by weight polycarbonate solution is preferably passed into this pipe at the pump pressure from the upstream concentration stage and expands at the bores with evaporation of the solvent as concentrated polycarbonate solution into the housing of the vented extruder directly below. The pressure on entry into the inlet element is preferably from 1.5 to 15 bar, and the pressure in the separator is 0.3 to 6 bar.

In a preferred embodiment, a heat exchanger may also be connected upstream of the flash devolatilizer, in order in this way to provide sufficient vaporization energy. The polycarbonate solution temperatures are preferably in the range from 180° C. to 300° C., more preferably from 200° C. to 250° C.

In this way, a more highly concentrated and also colder polycarbonate solution is supplied to the vented extruder. The efficiency of the vented extruder is enhanced in this way, since only a lower energy input is required for the removal of the remaining volatiles in the concentrated polycarbonate solution, and since a smaller amount of vapor has to be removed via the venting orifices thereof. This rise in efficiency in the vented extruder enables a decrease in the temperature and in the residence time of the polycarbonate solution in the extruder and thus leads to gentle residual devolatilization of the polycarbonate for the purposes of the invention.

The orifices of the preferred flash elements, the distributor plate and horizontal pipe, are preferably arranged such that they are above the screw shafts, such that polymer solution which leaves the bores, following gravity, falls essentially onto the screw shaft or screw shafts and can be pulled in directly. The orifices can be configured in accordance with the invention such that a mono- or biphasic flow exists before the orifices. For a monophasic flow above the orifices, the orifices are preferably designed such that flow through them gives rise to a pressure drop corresponding at least to the vapor pressure of the polycarbonate solution in the inlet. From the relationships known to the person skilled in the art between temperature and solvent concentration of a polycarbonate solution and the molecular weight and the vapor pressure and the viscosity of this polymer solution, the person skilled in the art can find a design which guarantees monophasicity above the die plate. If biphasicity is the aim, preference is given to using a pressure-retaining valve into the line upstream of the pipe or upstream of the distributor plate.

The shape of the orifices may, for example, be round, oval or slot-shaped. The smallest dimensions of the orifices at right angles to the flow direction of the orifices (width in the case of slots, small radius in the case of an ellipse, diameter in the case of a circular orifice) are, in accordance with the invention, between 2 mm and 50 mm, preferably between 5 mm and 30 mm. The number of bores is preferably selected such that the throughput per bore is from 5 kg/h to 100 kg/h, preferably from 10 kg/h to 50 kg/h and more preferably from 20 kg/h to 30 kg/h. The bores are preferably arranged in rows parallel to the extruder axis, more preferably in a square arrangement or in an arrangement in which the centers of the bores correspond to the corners of an equilateral triangle.

The temperature of the polymer solution which enters the flash devolatilizer is between 180° C. and 300° C. and preferably between 200° C. and 250° C. The absolute pressure in the separator of the flash devolatilizer is between 0.3 and 6 bar, preferably between 0.5 and 4 bar and more preferably between 1 and 2 bar.

In a preferred embodiment, the polymer solution, before entry into the flash devolatilizer, is heated by means of one or more heat exchangers to the temperature that it has on entry. The heat exchangers which are suitable for this purpose are well-known to those skilled in the art. For example, may be for this purpose smooth shell-and-tube heat exchangers, shell-and-tube heat exchangers which preferably with incorporated static mixers for improvement of heat transfer, or plate heat exchangers. The polymer solution is preferably in the interior of the tubes. The number of passages of these heat exchangers may be one or more, preferably one. Preference is given to smooth shell-and-tube heat exchangers or shell-and-tube heat exchangers equipped with static mixers to improve heat transfer. The heat exchangers can be heated, as known to those skilled in the art, with liquid or condensing heat carrier. For a liquid heat carrier, preference is given to organic heat carrier oils, for example Marlotherm LH or Marlotherm N. A condensing heat exchanger is preferably condensing steam or condensing heat carrier oil, for example diphyl. For quality reasons, the heating temperature selected for the heat transfer should not be too high; preference is given to a difference between the heating temperature and mean caloric exit temperature of less than 40 K, preferably of less than 30 K and more preferably of less than 20 K. The product residence time in the heat exchanger is preferably less than ten minutes, preferably less than five minutes and more preferably less than three minutes.

The heat exchanger(s) is/are preferably operated in monophasic mode. For this purpose, on the outlet side of the heat exchanger, preference is given to installing a pressure-retaining valve, which keeps the pressure at the outlet for the polymer solution greater than the vapor pressure of the polymer at heating temperature. The flow through the heat exchanger is preferably from the bottom upward.

In a particularly preferred embodiment, the separator has, in the upper region, at least one exit orifice for removal of gaseous vapors, at least one separation vessel, on the base of which melt particles entrained by the vapor stream can separate out, and a vapor condensation unit. Beyond the condensation unit, a unit for vacuum generation with pressure regulation may be present.

The polycarbonate solution comprises preferably 65-95% by weight of polycarbonate, based on the total weight of the polycarbonate solution.

In a preferred embodiment, the additional introduction of entraining gases upstream of the flash devolatilizer and/or in the vented extruder further improves the degree of removal of residual volatiles in the polycarbonate solution in a gentle manner. The particularly volatile dichloromethane is almost completely removed in this way before it comes into contact with the shafts of the extruder, as a result of which the harmful influence of dichloromethane on the color is avoided.

In a specific embodiment of the polycarbonate residue devolatilization process according to the invention, the above-described combination of flash devolatilizer and vented extruder is preceded upstream by a further flash devolatilizer or downpipe devolatilizer, into which a 55 to 80% by weight polycarbonate solution is introduced in a first process step and preconcentrated. The solution which has thus been preconcentrated to 70 to 95% by weight, preferably to 80 to 90% by weight, of polycarbonate is subsequently supplied to the above-described second flash devolatilizer which is connected directly to the vented extruder. In this way, it is possible to distribute the supply of the amount of heat required for vaporization of the volatile constituents in the polycarbonate solution over several apparatuses, and thus to select the apparatus temperatures such that overheating of the polycarbonate solution and the associated side reactions can be avoided.

The material for the flash devolatilizer should be resistant to corrosive attacks by dichloromethane and should not damage the polycarbonate. Preference is given to using a low-iron or iron-free material. Preference is given to nickel-based materials with iron contents less than 4% by weight, more preferably the alloys with materials numbers (according to Stahlschlüssel [Key to Steel] 2007, Verlag Wegst GmbH): 2.4605 (NiCr23 Mo16Al) and 2.4610 (NiMo16Cr16Ti). The polymer concentration at the inlet into the extruder is between 80 and 99% by weight, preferably 90 to 99% by weight.

The vented extruder may be of single-shaft or multishaft design, preferably single-shaft, twin-shaft or four-shaft, most preferably twin-shaft. The design of a multishaft vented extruder may be co- or counter-rotatory, closely intermeshing or tangential, or, in the case of four or more shafts, a combination of closely intermeshing and tangential. Particular preference is given to the design as a closely intermeshing, corotatory twin-screw extruder.

In a preferred embodiment, it is possible, for example, to use screw elements for multishaft screw machines with pairs of corotatory screw shafts and pairs of screw shafts which scrape one another exactly, with two or more screw flights Z, with an axis separation A and external diameter DE, where the sum of the flight angles of one element pair is greater than 0 and less than $$2\pi - 4Z \arccos\left(\frac{A}{DE}\right).$$

Such screw elements are described, for example, in German Offenlegungschrift DE 10 2008 029305.9, which was yet to be published at the filing date.

In a further preferred embodiment, for example, it is also possible to use screw elements with pairs of corotatory screw shafts and pairs of screw shafts which scrape one another exactly, the generating and generated screw profile having a sequence of sealing region-transition region-channel region-transition region, one sealing region being a sequence of flight region-flank region-flight region, one channel region being a sequence of groove region-flank region-groove region, and one transition region being a sequence of screw profile regions which begins with a flank region and ends with a flank region. The regions of a screw profile equal to the outer screw radius are referred to as flight regions. The regions of a screw profile equal to the core radius are referred to as groove regions. The regions of a screw profile which are less than the outer screw radius and greater than the core radius as referred to as flank regions. Such screw elements are, for example, in German Offenlegungsschrift DE 10 2008 029306.7, which was yet to be published at the filing date. In a "flight region", the screw elements have their greatest diameter and clean the wall. In a "groove region", the screw elements have their smallest diameter. In a "transition region", the screw elements have neither their greatest nor their smallest diameter.

The devolatilizing zones may be configured with two or three flights, preferably two flights.

A high level of devolatilization can be achieved especially when, in accordance with a further preferred embodiment, the extruder has several devolatilizing zones in conveying direction, to each of which a suction unit is attached. Very good results were achieved with an extruder which, beyond its intake orifice, has four to five devolatilizing zones in conveying direction, wherein the absolute pressure generated at the devolatilizing orifice assigned to the first devolatilizing zone was preferably in the range from 50 to 150 kPa, the absolute pressure generated at the devolatilizing orifice assigned to the second devolatilizing zone was preferably in the range from 0.3 to 10 kPa, and the absolute pressure generated at the devolatilizing orifice assigned to the third and further subsequent devolatilizing zones was preferably in the range from 0.1 to 3 kPa, the pressure preferably decreasing in each step. Each of the devolatilizing zones preferably has a devolatilizing dome through which the vapors which form are removed.

Between the different devolatilizing zones of the extruders are arranged backup zones in which a pressure drop is generated by neutral or backward-conveying elements, as a result of which the free cross section of the extruder is completely filled. This enables different pressures in the gas space of the devolatilizing zones. Preference is given to using kneading elements or backward-conveying screw elements for this purpose.

In a preferred embodiment, the devolatilization in the vented extruder can be positively influenced with an entraining agent which increases the devolatilization surface area. In the process according to the invention, the entraining agent is preferably added between the penultimate and the last devolatilizing zone in conveying direction. The entraining agent used may preferably be nitrogen. The entraining agent is dispersed in a kneading zone. The volume flow of entraining agent supplied should preferably at a shaft speed of less than or equal to 390 rpm be preferably 0.05 to 0.3% by mass. Downstream of the devolatilizing zone, additives and optionally a stream of molten polymer are also added, which are mixed with the main stream in a pressure buildup zone. The pressure buildup and mixing zone may be of one-, two- or three-flight design, preference being given to a two- or three-flight design and particular preference to a three-flight design. The three-flight design is associated with a reduction in the diameter if the preceding devolatilizing section has been in two-flight design.

The thermoplastic polycarbonates obtainable by the process according to the invention have a residual content of volatile substances (solvents, especially monochlorobenzene) of not more than 2000 ppm, preferably from 20 to 1000 ppm and more preferably from 50 to 600 ppm, based on the polymer material. The residual dichloromethane content is not more than 2 ppm, preferably less than 1 ppm and more preferably less than 0.5 ppm (free of dichloromethane).

Diphenols suitable for the process according to the invention for preparation of polycarbonate have been described many times in the prior art.

Suitable diphenols are, for example, hydroquinone, resorcinol, dihydroxydiphenyl, bis(hydroxyphenyl)alkane, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, α,α'-bis(hydroxyphenyl)diisopropylbenzenes, and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxy-phenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]-benzene and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

In the case of homopolycarbonates only one diphenol is used; in the case of copolycarbonates several diphenols are used; of course, the diphenols used, like all other chemicals and assistants added to the synthesis too, may be contaminated with the impurities originating from their own synthesis, handling and storage, although it is desirable to work with very substantially clean raw materials.

The monofunctional chain terminators required to regulate the molecular weight, for example phenol or alkylphenols, especially phenol, p-tert-butylphenol, isooctylphenol, cumylphenol, chlorocarbonic esters thereof, or acid chlorides of monocarboxylic acids, or mixtures of these chain terminators, are supplied to the reaction either with the bisphenoxide or the bisphenoxides, or else added at any other point in the synthesis, provided that phosgene or chlorocarbonic acid end groups are still present in the reaction mixture, or, in the case of the acid chlorides and chlorocarbonic esters as chain terminators, as long as sufficient phenolic end groups of the polymer which forms are available. Preferably, the chain terminator(s), however, is/are added after the phosgenation at a site or at a time where no phosgene is present any longer, but the catalyst is yet to be metered in. Alternatively, it can also be metered in before the catalyst, together with the catalyst or in parallel.

In the same way, branching agents or branching agent mixtures are optionally added to the synthesis. Typically, branching agents, however, are added before the chain terminators. In general, trisphenols, quaterphenols or acid chlorides of tri- or tetracarboxylic acids, or mixtures of the polyphenols or of the acid chlorides, are used. Some of the compounds which have three or more than three phenolic hydroxyl groups and are suitable as branching agents are, for example, phloroglucinol, 4,6-dimethyl-2,4,6-tri(4-hydroxyphenyl)heptene-2,4,6-dimethyl-2,4,6-tri(4-hydroxyphenyl)heptane, 1,3,5-tri(4-hydroxyphenyl)benzene, 1,1,1-tri(4-hydroxyphenyl)-ethane, tri(4-hydroxyphenyl)phenylmethane, 2,2-bis(4,4-bis(4-hydroxyphenyl)cyclohexyl)-propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The catalysts used with preference in the interfacial synthesis of polycarbonate are tertiary amines, especially triethylamine, tributylamine, trioctylamine, N-ethylpiperidine, N-methylpiperidine, N-i/n-propylpiperidine, quaternary ammonium salts such as tetrabutylammonium hydroxide, chloride, bromide, hydrogensulfate or tetrafluoroborate, tributylbenzylammonium hydroxide, chloride, bromide, hydrogensulfate or tetrafluoroborate, tetraethylammonium hydroxide, chloride, bromide, hydrogensulfate or tetrafluoroborate, and the phosphonium compounds corresponding to the ammonium compounds. These compounds are described in the literature as typical interfacial catalysts, and are commercially available and familiar to the person skilled in the art. The catalysts can be added to the synthesis individually, in a mixture or else alongside one another and successively, optionally also before the phosgenation, but preference is given to metered additions after the introduction of phosgene, unless an onium compound or a mixture of onium compounds is used as catalysts. In this case, preference is given to addition before the metered addition of phosgene. The catalyst(s) can be metered in substance, in an inert solvent, preferably the solvent of the polycarbonate synthesis, or else as an aqueous solution, and in the case of the tertiary amines as the ammonium salts thereof with acids, preferably mineral acids, especially hydrochloric acid. In the case of use of several catalysts or the metered addition of portions of the total amount of catalyst, it is of course also possible to undertake different metering methods at different sites or at different times. The total amount of the catalysts used is 0.001 to 10 mol % based on moles of bisphenols used, preferably 0.01 to 8 mol %, more preferably 0.05 to 5 mol %.

The polycarbonate synthesis can be performed continuously or batchwise. The reaction can therefore be effected in stirred tanks, tubular reactors, pumped circulation reactors or stirred tank cascades, or combinations thereof. By using the mixing units already mentioned, it should be ensured that aqueous and organic phases separate as far as possible only when the synthesis mixture has reacted to completion, i.e. no longer contains any hydrolyzable chlorine of phosgene or chlorocarbonic esters.

After introduction of the phosgene, it may be advantageous to mix the organic phase and the aqueous phase for a certain time before any branching agent, if it has not been metered in together with the bisphenoxide, chain terminator and catalyst are added. Such a continued reaction time may be advantageous after each metered addition. These continued stirring times are 10 seconds to 60 minutes, preferably 30 seconds to 40 minutes, more preferably 1 to 15 minutes.

The organic phase may consist of solvent or mixtures of several solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene, and mixtures thereof. However, it is also possible to use aromatic hydrocarbons such as benzene, toluene, m/p/o-xylene, or aromatic ethers such as anisole alone, in a mixture with or in addition to chlorinated hydrocarbons. Another embodiment of the synthesis uses solvents which do not dissolve polycarbonate, but merely swell it. It is therefore also possible to use nonsolvents for polycarbonate in combination with solvents. The solvents used in the aqueous phase too may be soluble solvents such as tetrahydrofuran, 1,3/1,4-dioxane or 1,3-dioxolane when the solvent partner forms the second organic phase.

The completely reacted at least biphasic reaction mixture which contains at most traces (<2 ppm) of chlorocarbonic esters is left to stand for phase separation. The aqueous alkaline phase is possibly passed completely or partly back into the polycarbonate synthesis as an aqueous phase, or else sent to wastewater treatment, where solvent and catalyst components are removed and recycled. In another variant of the workup, after removal of the organic impurities, especially of solvents and polymer residues, and optional after the establishment of a particular pH, for example by adding sodium hydroxide solution, the salt which can be supplied, for example, to the chloralkalielectrolysis is removed, while the aqueous phase is optionally sent back to the synthesis.

The organic phase comprising the polycarbonate can then be purified to free it of all contaminations of alkaline, ionic or catalytic-nature. The organic phase, even after one or more phase separations, still contains proportions of the aqueous alkaline phase in fine droplets, and the catalyst, generally a tertiary amine. The phase separations can optionally be promoted by virtue of the organic phase passing through settling tanks, stirred tanks, coalescers or separators, or combinations thereof, in which case water can optionally be metered in each or some separation steps, under some circumstances using active or passive mixing units.

After this rough separation of the alkaline aqueous phase, the organic phase is washed once or more than once with dilute acids, mineral acids, carboxylic acids, hydroxycarboxylic acids and/or sulfonic acids. Preference is given to aqueous mineral acids, especially hydrochloric acid, phosphorous and phosphoric acid, or mixtures of these acids. The concentration of these acids should be in the range of 0.001 to 50% by weight, preferably 0.01 to 5% by weight.

In addition, the organic phase is washed repeatedly with demineralized or distilled water. The organic phase, optionally dispersed with portions of the aqueous phase, is removed after the individual wash steps by means of settling tanks, stirred tanks, coalescers or separators or combinations thereof, in which case the washing water can optionally be metered in between the wash steps using active or passive mixing units.

Between these wash steps or else after the washing, it is optionally possible to add acids, preferably dissolved in the solvent which forms the basis of the polymer solution. Preference is given here to using hydrogen chloride gas and phosphoric acid or phosphorous acid, which can optionally also be used as mixtures.

This purified solution is then supplied in the subsequent step to the inventive flash devolatilizer/vented extruder combination.

The polycarbonates obtained by the process according to the invention can be provided with the customary additives (e.g. assistance and reinforcing agents) to alter the properties. The addition of additives and admixtures serves to prolong the use time (e.g. hydrolysis or degradation stabilizers), to improve color stability (e.g. thermal and UV stabilizers), to simplify processing (e.g. demolding agents, flow assistants), to improve the use properties (e.g. antistats), to improve flame retardancy, to influence the visual impression (e.g. organic colorants, pigments) or to adjust the polymer properties to particular stresses (impact modifiers, finely divided minerals, fibrous substances, quartz flour, glass fibers and carbon fibers).

In FIG. 1, the polymer solution is supplied through a feed line 1 to the shell-and-tube heat exchanger 2. The shell-and-tube heat exchanger is heated with heating medium which is supplied at 3 and removed at 4. The pressure in the heat exchanger 2 is kept above the vapor pressure of the solution at heating temperature with the valve V. Thereafter, the polymer solution expands via the product distributor 5 and the nozzle plate 6 into the separation vessel 7 arranged directly above the extruder. The gas released is removed via the vapor line 8. The product falls directly into the intake zone 9 of the extruder and is supplied through a backup zone 10 to a first devolatilizing zone 11 which has a devolatilizing dome 12. These are followed by further backup zones 10 and devolatilizing zones 11. Upstream of the last devolatilizing dome, nitrogen is added via the feed line 14 via the addition point 13 in the kneading zone 12. At the addition point 15, additives and optionally molten polymer are also added, which are mixed with the polymer stream in the pressure buildup and mixing zone 16.

Figure 2:
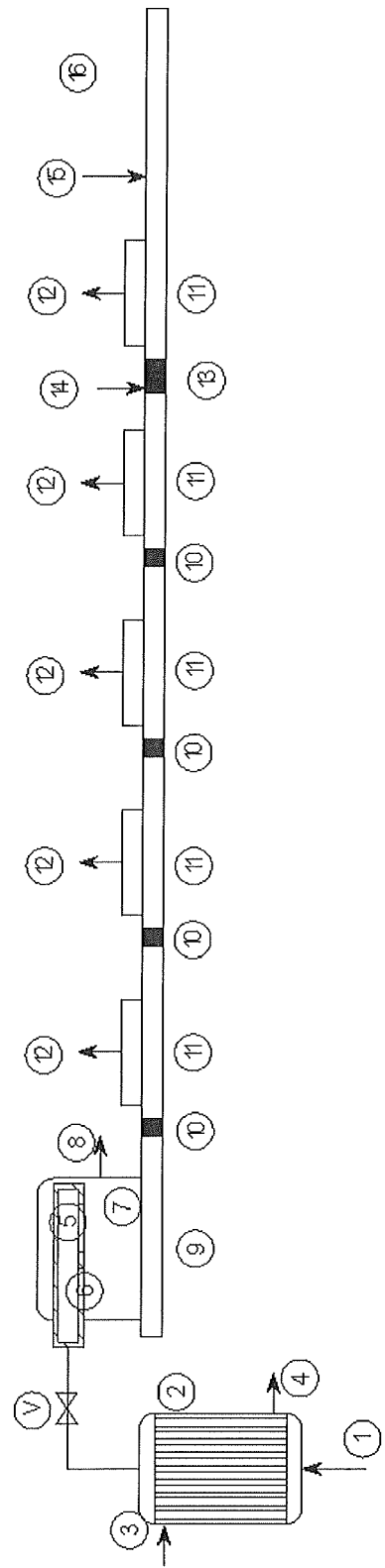
FIG. 2 is the polymer solution is supplied through a feed line to the shell-and-tube heat exchanger.

In FIG. 2, the polymer solution is supplied through a feed line 1 to the shell-and-tube heat exchanger 2. The shell-and-tube heat exchanger is heated with heating medium which is supplied at 3 and removed at 4. The pressure in the heat exchanger 2 is kept above the vapor pressure of the solution at heating temperature with the valve V. Thereafter, the polymer solution expands via the inserted tube 5 and the orifices 6 into the separation vessel 7 arranged directly above the extruder. The gas released is removed via the vapor line 8. The product falls directly into the intake zone 9 of the extruder and is supplied through a backup zone 10 to a first devolatilizing zone 11 which has a devolatilizing dome 12. These are followed by further backup zones 10 and devolatilizing zones 11. Upstream of the last devolatilizing dome, nitrogen is added via the feed line 14 via the addition point 13 in the kneading zone 12. At the addition point 15, additives and optionally molten polymer are also added, which are mixed with the polymer stream in the pressure buildup and mixing zone 16.

Figure 3:
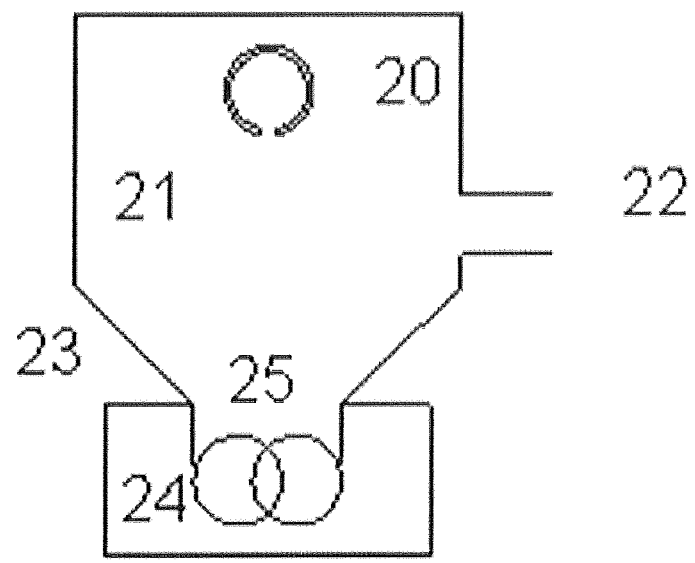
FIGS. 3 and 4 show a view of the flash devolatilizer with deposition vessel and, below it, extruder shafts in the direction parallel to the axes of the extruder.
Figure 4:
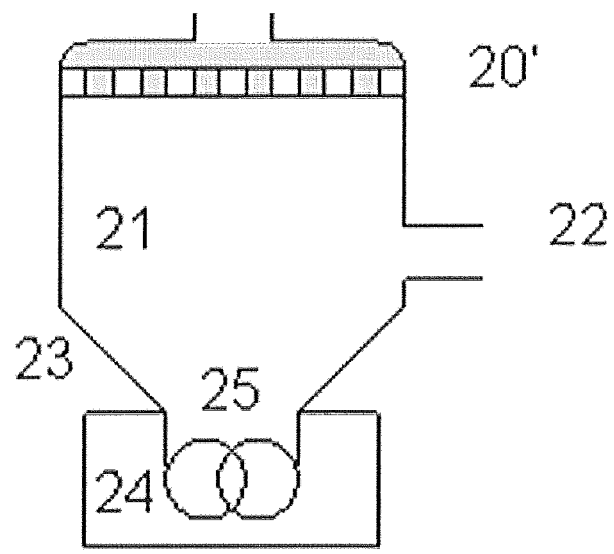

FIGS. 3 and 4 show a view of the flash devolatilizer with deposition vessel and, below it, extruder shafts in the direction parallel to the axes of the extruder. The polycarbonate solution is introduced into the separator 16 from above through the flash tube 20 or 20'. The vapors are separated from the concentrated polymer solution in the separator 21. The vapors are supplied to the condensation through the vapor line 22. The concentrated polymer solution predominantly hits the extruder shafts 25 directly, and to a smaller degree the cone 23, from whence it flows away to the extruder shafts under the action of gravity. The extruder shafts are arranged in the extruder housing 24 which is open at the top.

The examples which follow serve to illustrate the invention by way of example and should not be interpreted as a restriction.

EXAMPLES

The yellowness index YI was determined to ASTM E 313 on injection-molded samples of thickness 4 mm. The injection temperature was 300° C.

The relative viscosity is the ratio of the viscosity of a solution of 0.5 g of polycarbonate in 100 ml of dichloromethane to the viscosity of the pure solvent at 25° C.

Example 6.5 t/h of polycarbonate were isolated in an inventive apparatus from a solution of 65% by weight of polycarbonate, 33.5% by weight of chlorobenzene and 1.5% by weight of methylene chloride. The vented extruder used was designed as a closely intermeshing, corotatory twin-screw extruder and had a screw diameter of 178 mm, and a ratio of length of the extruder to the diameter of 48, and was of two-flight design in the intake zone and the devolatilizing zones. The flash devolatilizer consisted of a pipe of diameter 150 mm, which was slotted at the bottom. The inlet temperature into the flash devolatilizer was 230° C. In an entraining agent zone, 13 kg/h of nitrogen were supplied. The isolated polycarbonate had a relative viscosity of 1.295.

The residual chlorobenzene content in the isolated polycarbonate was 330 ppm and the dichloromethane content was below the detection limit of 0.5 ppm. The maximum temperature at the nozzle of the extruder was 391° C. The yellowness index of the polycarbonate was 1.7.

Comparative Example 6.5 t/h of polycarbonate were isolated in an extruder with backward devolatilization from a solution of 65% by weight of polycarbonate, 33.5% by weight of chlorobenzene and 1.5% by weight of methylene chloride. The vented extruder used was, analogously to the inventive example, designed as a closely intermeshing, corotatory twin-screw extruder and had a screw diameter of 178 mm, and a ratio of length of the extruder to the diameter of 48, and was of two-flight design in the intake zone and the devolatilizing zones. In an entraining agent zone, just as in the inventive example, 13 kg/h of nitrogen were supplied. The temperature of the polymer solution before the backward devolatilization was 185° C. The entry into the extruder was via a valve. The isolated polycarbonate had a relative viscosity of 1.295.

The residual chlorobenzene content in the isolated polycarbonate was 410 ppm and the dichloromethane content was 0.5 ppm. The temperature at the nozzle of the extruder was 409° C. The yellowness index of the polycarbonate was 2.3.

The invention claimed is:

1. An apparatus for devolatilizing solvent-containing polycarbonate melts, wherein a flash devolatilizer, comprising an inlet having one or more pipes with orifices, is combined with a vented extruder, said flash devolatilizer being arranged directly above said extruder.

2. The apparatus as claimed in claim 1, wherein vapor lines are mounted on the flash devolatilizer.

3. The apparatus as claimed in claim 1, wherein the flash devolatilizer is heated by means of condensing steam, by means of a condensing organic heat carrier or by means of a liquid organic heat carrier.

4. The apparatus as claimed in claim 1, wherein the combination of a flash devolatilizer and vented extruder is upstream of at least one further flash devolatilizer.

5. The apparatus as claimed in claim 1, wherein the vented extruder is of two- or four-shaft design.

6. The apparatus as claimed in claim 1, wherein the vented extruder is a closely intermeshing, corotatory twin-screw extruder.

7. The apparatus as claimed in claim 1, wherein the extruder has several devolatilizing zones in a conveying direction.

8. A process for devolatilizing polycarbonate solutions as claimed in claim 1, wherein a polycarbonate solution comprising at least one organic solvent and at least one polycarbonate is prepared by the interfacial process and, in a second step, this polycarbonate solution is supplied to a flash devolatilizer in combination with a vented extruder, said flash devolatilizer being arranged directly above the extruder such that the polymer solution falls directly into the vented extruder.

9. The process as claimed in claim 8, wherein the solvent-containing vapors formed in the flash devolatilizer are removed directly from the housing of the flash devolatilizer by means of vapor lines.

10. The process as claimed in claim 8, wherein inert gases as entraining agents are injected into and mixed into the polymer melt stream upstream of the flash devolatilizer.

11. The process as claimed in claim 8, wherein inert gas is injected as entraining agent in one or more housings of the vented extruder.

12. The process as claimed in claim 8, wherein the input concentration of the polycarbonate into the flash devolatilizer is between 60% by weight and 95% by weight.

13. The process as claimed in claim 8, wherein the polymer is heated by means of a heat exchanger before entering the flash devolatilizer.

14. The process as claimed in claim 8, wherein the polycarbonates obtained have a residual solvent content of 20 ppm to 1000 ppm.

* * * * *